Patented May 4, 1948

2,440,850

UNITED STATES PATENT OFFICE 2,440,850

DRIVING AND BRAKING DEVICE

Richard M. Dilworth, Hinsdale, Ill., assignor to General Motors Corporation, Detroit, Mich., a corporation of Delaware Application February 7, 1944, Serial No. 521,391

7 Claims. (Cl. 230—271)

The present invention generally relates to frictional driving and braking means and more particularly relates to combined driving and braking means of the fluid actuated type.

The principal object of the present invention is to provide a simple and compact driving and braking assembly including a single fluid-distensible actuating member for causing smooth engagement of either the driving or the braking means.

The assembly by which the above object is accomplished will become apparent by reference to the following detailed description and accompanying drawings illustrating one form of the invention which is particularly adapted to vertical shaft drives for ventilating fans.

Figure 1:
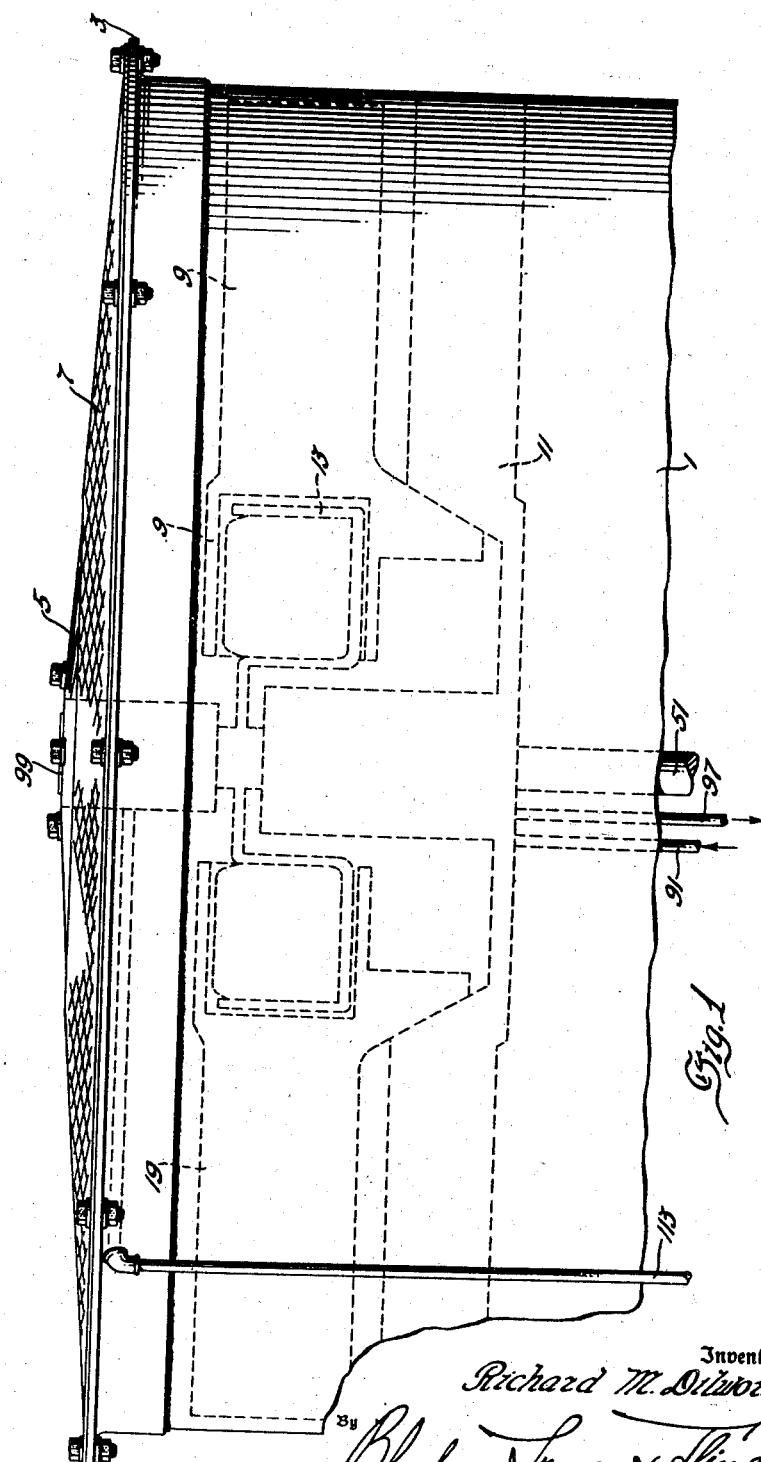
Figure 2:
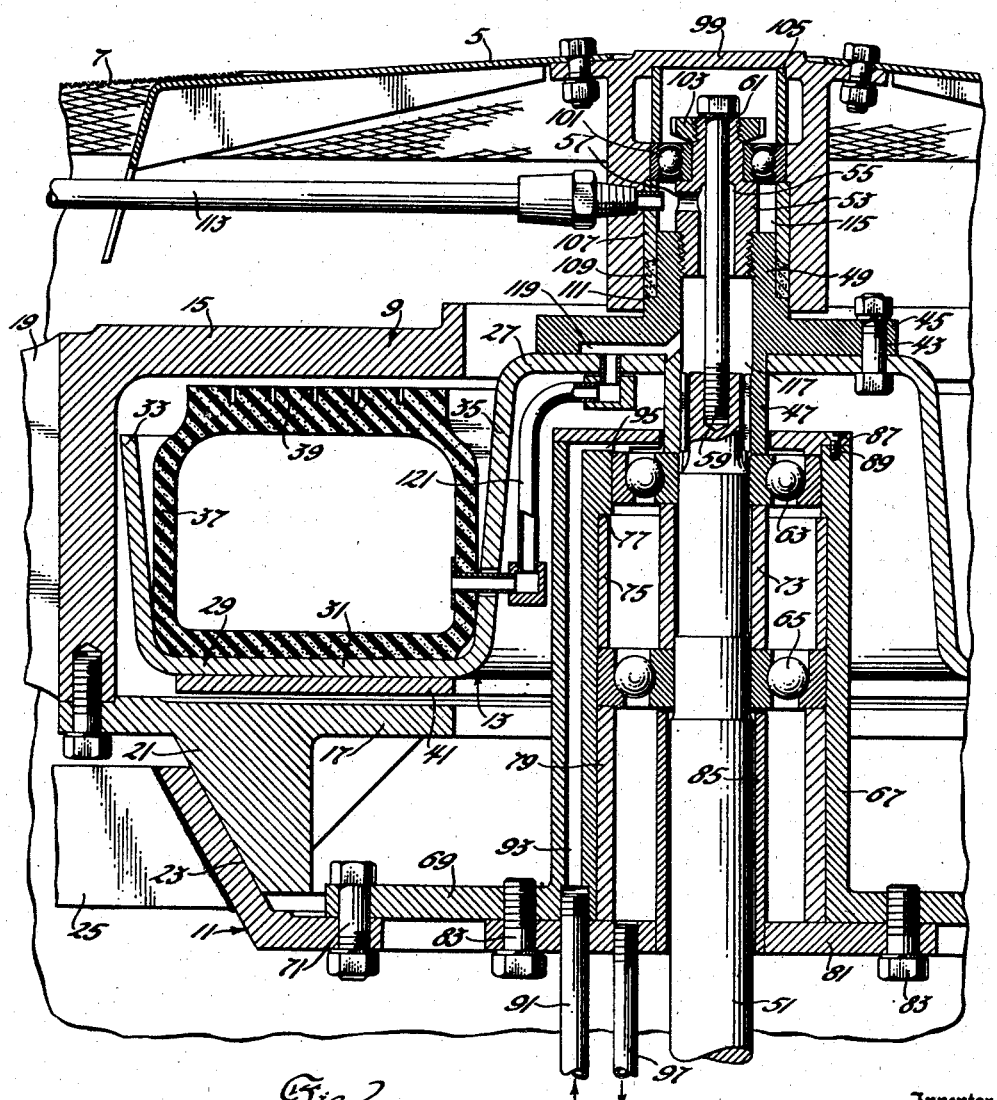

Figure 1 of the drawings is an elevation view of the complete assembly of the driving and braking means for a ventilating fan with certain parts broken away, and Figure 2 of the drawings is an enlarged axial section of the assembly with certain of the parts broken away to show details of certain of the parts to better advantage.

As best shown in Figure 1, the fan driving and braking assembly is enclosed in a cylindrical housing 1 provided with an upper external mounting flange 3 for supporting the housing in a vertical position. The housing is open at the bottom and is provided with a housing cap 5 having a screened opening 7 for the passage of air longitudinally through the housing.

As best shown in Figure 2, driven, supporting and driving members, respectively indicated generally at 9, 11 and 13, are arranged coaxially with the housing.

The driven member 9 comprises a drum-shaped hub provided with axially spaced internal flanges 15 and 17 and fan blades 19 extending radially outwardly therefrom and shown located adjacent the screened opening 7 in the housing cap 5. The hub flange 17 is removably secured to the member 9 and is provided with a concentric rib 21 on the outer radial face thereof having an external conical braking and supporting surface 23 which normally rests on an internal conical braking and supporting surface provided on the supporting member 11.

The supporting member 11 is supported coaxially in the housing by radial struts 25 secured to the supporting member 11 and housing 1 in order to provide free passage of the air through the housing past the supporting, driving and driven members.

The driving member 13 comprises a disc formed with a radially extending hub portion 27 and a peripheral portion, indicated generally at 29, which extends into the space between the axially spaced internal flanges 15 and 17 of the driven member 9. The peripheral portion 29 of the driving member is of annular trough shaped form having a bottom portion 31 extending between and parallel to the internal flanges 15 and 17 of the driven member 9, and side wall portions 33 and 35 diverging from the bottom portion 31 and extending toward the internal flange 15 of the driven member 9. A flexible annular pneumatic rubber tire 37 of substantially rectangular cross section is positioned in the annular groove of the driving member and is secured thereto by vulcanizing one radial face of the tire to the inner radial face of the bottom portion 31 of the annular trough portion of the driving member. The opposite radial face of the tire is provided with a ribbed surface 39 for frictional driving engagement with the flange 15 of the driven member 9, and a ring of friction material 41 is secured to the outer radial face of the portion 31 of the driving member 13 for frictional driving engagement with the other flange 17 of the driven member 9.

The hub portion 27 of the driving member is secured by bolts 43 to a driving flange 45 provided with axially extending hub portions 47 and 49. The flange and hub portions are bored axially and the hub portion 47 extends through a hole in the hub portion 27 of the driving member 13 and is splined on the end of a driving shaft 51, shown extending coaxial with respect to the driven, driving and supporting members. A plug 53 having an axial bore 55 and a radial passage 57 registering therewith, is threaded in the axial bore in the driving flange hub portion 49. A stud 59, having a gasket 61 under the head, extends through the axial bore 55 of the plug 53 and is threaded into an axial bore in the end of the driving shaft 51 to prevent relative axial movement between the driving flange 45 and driving shaft 51.

The driving flange 45 and driving shaft 51 are supported for coaxial rotation with respect to the driven and supporting member by means of thrust bearings 63 and 65 located in a cylindrical bearing housing 67 provided with a mounting flange 69 which is secured by bolts 71 to the supporting member 11. The end of the driving flange hub portion 47 contacts the inner race of the bearing 63 and a spacing sleeve 73 is placed on the driving shaft between the inner races of the bearings 63 and 65, which are pressed on the driving shaft.

A spacing sleeve 75 is also placed between the outer race of the bearing 65 and an internal shoulder 77 adjacent one end of the bearing housing 67 and another spacing sleeve 79 is placed between the outer race of the bearing 65 and an end closure plate 81 secured to the other end of the housing by cap screws 83. The closure plate 81 has an opening in which an oil retaining sleeve 85 is secured. This sleeve surrounds the driving shaft and extends to point adjacent in the inner race of the bearing 65. The other end of the bearing housing 67 is closed by a housing cap 87 secured thereto by machine screws 89. The housing cap 87 also contacts the outer race of the bearing 63 and the hub 47 of the driving flange 45 projects through an opening in the cap 87.

Lubricating oil is supplied through a pipe 91 shown extending through an opening in the closure plate 81 and is threaded in a longitudinal passage 93 in the bearing housing. The oil passage 93 communicates with aligned radial passages indicated at 95 in the bearing housing 67 and cap 87 so that oil enters the bearing housing 67 through the bearing 63. Oil passes from the bearing housing through a drain pipe 97 threaded in an opening in the closure plate 81, which opening is located between the oil retaining sleeve 85 and the spacing sleeve 79.

A combined bearing housing and air pressure sealing cap 99 is secured to the housing cap 5 and extends over the hub portion 49 of the driving flange 45. An anti-friction radial bearing 101 is located in the cap. This inner race of this bearing is secured by a nut 103 on a shouldered portion of the plug 53 and the outer bearing race is supported in the cap 99. Spacing sleeve 105 and 107 are placed in the cap either side of the outer race of the bearing 101. A pressure sealing member 109 is held in sealing contact with the inner surface of the cap 99, and with the external surface of the hub 47 of the driving flange and a shoulder 111 thereon by the spacing sleeve 107 which is secured in the cap by an air tube 113 connected to an opening in the cap and extending through an opening in the sleeve 107.

Air pressure is conducted to and vented from the pneumatic tire 37 by means of the tube 113. The inner end of the tube 113 terminates in a space 115 in the cap 99 between the bearing 101 and the hub portion 49 of the driving flange 45. The space 115 by reason of the axial and radial openings 55 and 57 in the plug 53 is placed in communication with the space 117 in the driving flange 49 between the plug 53 and the end of the driving shaft 51. A passage 119 in the driving flange 45 communicates with the space 117 and a tube 121 is connected between the interior of the tire 37 and the passage 119.

Operation of the above described assembly is briefly as follows: With the parts of the assembly in the positions shown, the driving member 13 is freely rotatable with respect to the driven member 9 which is supported in spaced concentric relation with respect to the driving member by engagement of the conical supporting and braking surface of the lower flange 17 of the driven member with the conical supporting and braking surface of the stationary supporting member 11. Upon initial inflation of the tire, the upper ribbed surface 39 thereof is moved gradually upwardly into frictional supporting and driving engagement with the inner surface of the upper flange 15 of the driven member 11 which causes gradual upward movement thereof. The lower flange 17 of the driven member is accordingly moved gradually upwardly causing the conical supporting and braking surface of the flange 17 to be gradually moved out of braking supporting contact with the conical surface on the supporting member. The driven member 9 and fan blades 19 are accordingly accelerated gradually by gradual engagement with the driving member and gradual disengagement from the supporting member. Further inflation of the tire causes further upward movement of the driven member which causes the upper surface of the flange 17 of the driven member to engage the friction material 41 secured to the lower face of the driving member thereby clamping the driven member in frictional and supporting driving relation with the driving member thereby causing rotation of the driven member and the fan blades 19 thereon at the speed of the driving member. The air moved by these fan blades circulates freely in the housing 1 to cool the frictional engaging surfaces of the driving, driven and supporting members. Deflation of the tire 37 conversely causes gradual movement of the driven member downwardly which successively causes gradual disengagement between the above mentioned lower and upper driving and supporting surfaces provided on the driving and driven members and gradual engagement of the conical supporting and braking surfaces provided on the driven and stationary supporting members, thereby causing deceleration of the driven member to rest.

I claim:

1. A driving assembly comprising a driving member, a driven member, stationary means for normally supporting said members in coaxial relation and a resilient fluid pressure expansible tube in concentric relation between said driving and driven members for controlling gradual axial movement of said driven member out of supporting relation on said stationary means and into resilient supporting and driving engagement with said driving member.

2. A driving and braking assembly comprising a driving member, a driven member, stationary means for supporting said members, said means including bearings for rotatably supporting said driving member and a braking surface adapted to normally support said driven member in coaxial relation with said driving member, and a resilient, fluid expansible and collapsible tire in concentric relation between said driving and driven members for controlling gradual axial movement of said driven member out of supporting relation on the braking surface of said stationary means and into resilient supporting and driving engagement with said driving member.

3. A driving and braking assembly comprising a stationary support member having a circular supporting and braking surface, a driven drum having internal flanges and an external surface normally engaging the supporting and braking surface of said support member, a circular driving member having a pneumatic tire secured to one side thereof, said driving member and tire being rotatably supported in concentric relation between the flanges of said driven drum so that upon inflation of said tire the driven drum is moved out of supporting and braking engagement with said support member and clamped in concentric relation to said driving member for rotation thereby.

4. A driving and braking assembly comprising a stationary support member having a circular depression therein, a driven drum supported in said depression, said drum having internal flanges, a driving member having an annular depression therein, a pneumatic tire in said annular depression, said driving member being supported for rotation by said support member in concentric relation within said drum between the flanges thereof, and means for inflating and deflating said tire to cause said drum to be moved into clamping engagement with said driving member and tire or moved into supporting engagement with said stationary support member.

5. A driving and braking assembly comprising a stationary member having a conical depression therein, a driving member having an annular depression therein, a pneumatic tire in the annular depression of said driving member, said driving member being supported for rotation by said stationary member about the axis of the conical depression therein, a driven drum having a conical surface and internal flanges, said conical drum surface normally resting in said conical depression in said stationary member so that said drum flanges extend on either side of the annular depression in said driving member, and rotary pressure sealing means supported on and cooperating with said driving member and tire for causing inflating or deflating said tire to cause said driven drum to be moved into clamping and supporting engagement with said driving member or supported on said stationary member.

6. A fan driving and braking assembly comprising a stationary member having a conical braking and positioning surface, a fan having a drum-shaped hub with internal flanges and a concentric conical braking and supporting surface supported in and positioned by the conical braking and positioning surface of the stationary member, a driving member having an annular depression supported for rotation in said stationary member about the axis of the conical braking and positioning surface thereof, the annular depression in the driving member being positioned between the flanges of said fan drum, a fluid distensible tire supported in the annular depression in the driving member, and rotary sealing means cooperating with said driving member and tire for causing fluid pressure to be applied to or exhausted from said tire in order to cause said fan drum to be gradually moved into clamping and supporting engagement with said tire and driving member for causing acceleration of said fan or supported on the braking and positioning surface of said stationary member to cause deceleration of said fan.

7. A fan driving and braking assembly comprising a vertical housing, a support member secured transversely in said housing, said member being provided with air passages therethrough and a conical supporting and braking surface, a driving shaft supported for rotation in said member about the axis of the conical surface, a driving member secured to said shaft, said driving member having an annular depression therein, a pneumatic clutch tire secured to the bottom of said annular depression, a pressure sealing member cooperating with said driving member and connected to said tire to permit inflation or deflation thereof in order to cause expansion or contraction thereof, a fan having a hub portion provided with axially spaced internal flanges and a lower conical surface normally guided and supported on the conical supporting and braking surface of said support member in order to position internal flanges of said fan hub adjacent the upper surface of said tire and lower surface of the annular depression of said driving member so that upon inflation of said tire the fan will be moved upwardly out of frictional and supporting contact with said support member and will be clamped in concentric relation to said driving member by the force exerted by said tire on the flanges of the fan hub and when deflated said fan will be moved downwardly out of contact with said driving member and into normal contact with said support member.

RICHARD M. DILWORTH.

REFERENCES CITED

The following references are of record in the file of this patent:

UNITED STATES PATENTS

| Number | Name | Date |
| --- | --- | --- |
| 1,757,773 | Klein | May 6, 1930 |
| 2,104,580 | Brewer | Jan. 4, 1938 |